United States Patent
Turner et al.

(10) Patent No.: US 7,377,356 B2
(45) Date of Patent: May 27, 2008

(54) DRIVER SELECTABLE STEERING RATIOS

(75) Inventors: Marcus Turner, Coventry (GB); Ian Hulme, Leamington Spa (GB)

(73) Assignee: Ford Global Technologies, LLC, Dearborn, MI (US)

( * ) Notice: Subject to any disclaimer, the term of this patent is extended or adjusted under 35 U.S.C. 154(b) by 4 days.

(21) Appl. No.: 10/853,046

(22) Filed: May 25, 2004

(65) Prior Publication Data
US 2005/0263338 A1  Dec. 1, 2005

(51) Int. Cl.
*B62D 5/04* (2006.01)
(52) U.S. Cl. ..................................... 180/446
(58) Field of Classification Search ................ 180/446
See application file for complete search history.

(56) References Cited

U.S. PATENT DOCUMENTS

| | | | |
|---|---|---|---|
| 4,522,279 A | | 6/1985 | Kanazawa |
| 4,573,705 A | * | 3/1986 | Kanai et al. ................ 180/422 |
| 4,574,905 A | | 3/1986 | Asano et al. |
| 4,658,927 A | | 4/1987 | Kanazawa |
| 4,705,135 A | * | 11/1987 | Kawamoto et al. ......... 180/236 |
| 4,768,602 A | | 9/1988 | Inoue et al. |
| 4,914,592 A | * | 4/1990 | Callahan et al. .............. 701/41 |
| 5,084,821 A | | 1/1992 | Ohsuga et al. |
| 5,265,019 A | | 11/1993 | Harara et al. |
| 5,887,675 A | * | 3/1999 | Hackl et al. ................ 180/422 |
| 6,108,599 A | * | 8/2000 | Yamamoto et al. ........... 701/41 |

FOREIGN PATENT DOCUMENTS

| | | |
|---|---|---|
| EP | 0853029 | 7/1998 |
| EP | 1325857 | 7/2003 |
| WO | 03024764 | 3/2003 |
| WO | 2005028283 | 3/2004 |

* cited by examiner

*Primary Examiner*—Lesley D. Morris
*Assistant Examiner*—Marlon Arce-Diaz
(74) *Attorney, Agent, or Firm*—Gregory P. Brown; Price, Heneveld, Cooper, DeWitt & Litton, LLP

(57) ABSTRACT

A steering system (10) for a vehicle including a steerable wheel (12) defining a steering angle (20), a powered actuator (14) controlling the steering angle (20) and a steering wheel (16) providing a driver input control angle. A ratio of the driver input control angle to the steering angle (20) defines a steering ratio. The steering system (10) also includes a controller (18) selectively varying the steering ratio that directs the powered actuator (14) to change the steering angle (20) along one of at least two steering ratio graphs, and a control (60) manually selectable by a driver of the vehicle that communicates with the controller 18 for selecting one of the steering ratio graphs. A first one of the graphs (50) varies as a function of the driver input control angle in a manner that is different than that of a second one of the graphs (52).

26 Claims, 2 Drawing Sheets

DRIVER SELECTABLE STEERING RATIOS

BACKGROUND OF THE INVENTION

The present invention relates to a motor vehicle, and in particular to an active front steering system for a motor vehicle.

Active front steering systems for motor vehicles are used to rotate the wheels of the vehicle at a different rate than the rotation of the steering wheel of the vehicle or without rotation of the steering wheel. The ratio of the rotation of the steering wheel to the rotation of the wheel defines a steering ratio. The active front steering system therefore sets the steering ratio of the vehicle. Without the active front steering system, the steering ratio is typically only determined by the ratio set by the mechanical connections between the steering wheel and the wheel of the vehicle.

Heretofore, active front steering systems have included a powered actuator operably connected to an input of a rack-and-pinion system of a steering system of a vehicle. The active front steering system assists in pivoting the steerable wheels. In basic operation, the active front steering system typically augments a driver input control angle from the driver as applied to the steering wheel, via the powered actuator, to rotate the wheels according to the steering ratio.

SUMMARY OF THE INVENTION

One aspect of the present invention is to provide a steering system for a motor vehicle including a steerable wheel defining a steering angle, a powered actuator controlling the steering angle and a steering wheel providing a driver input control angle. A ratio of the driver input control angle to the steering angle defines a steering ratio. The steering system also includes a controller which selectively varies the steering ratio. The controller directs the powered actuator to change the steering angle such that the steering ratio is a function of one of at least two steering ratio graphs. Each steering ratio graph varies the steering ratio in relation to the driver input control angle. The steering system further includes a control manually selectable by a driver of the vehicle. The control communicates with the controller for selecting one of the steering ratio graphs. A first one of the steering ratio graphs varies as a function of the driver input control angle in a manner that is different than that of a second one of the steering ratio graphs.

Another aspect of the present invention is to provide a method for selectively varying a steering ratio of a motor vehicle having a steerable wheel defining a steering angle and a steering wheel providing a driver input control angle, a ratio of the driver input control angle to the steering angle defining the steering ratio. The motor vehicle further has a powered actuator controlling the steering angle. The method comprises the step of manually selecting one of at least two steering ratio graphs, with each steering ratio graph defining the steering ratio corresponding to the driver input control angle. The method also includes the step of directing the powered actuator according to the selected steering ratio graph. A first one of the steering ratio graphs varies as a function of the driver input control angle in a manner that is different than that of a second one of the steering ratio graphs.

Yet another aspect of the present invention is to provide a method for selectively varying a steering ratio of a motor vehicle having a steerable wheel defining a steering angle and a steering wheel providing a driver input control angle. A ratio of the driver input control angle to the steering angle defines the steering ratio. The motor vehicle further has a powered actuator controlling the steering angle. The method comprises the steps of providing a controller for selectively varying the steering ratio, manually selecting at least one of two driving conditions with a control and communicating the selected driving condition from the control to the controller. The method further includes the step of directing the powered actuator with the controller to change the steering angle such that the steering ratio is a function of one of at least two steering ratio graphs, with each steering ratio graph corresponding to one of the driving conditions. Each steering ratio graph also varies the steering ratio in relation to the driver input control angle. A first one of the steering ratio graphs varies as a function of the driver input control angle in a manner that is different than that of a second one of the steering ratio graphs.

Accordingly, the driver of the vehicle is able to manually select a steering ratio that will best fit the driving conditions of the vehicle and/or the driver's desired steering performance. The vehicle steering system is easy to implement, capable of a long operable life, and particularly adapted for the proposed use.

These and other features, advantages, and objects of the present invention will be further understood and appreciated by those skilled in the art by reference to the following specification, claims and appended drawings.

DETAILED DESCRIPTION OF THE PREFERRED EMBODIMENTS

For purposes of description herein, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
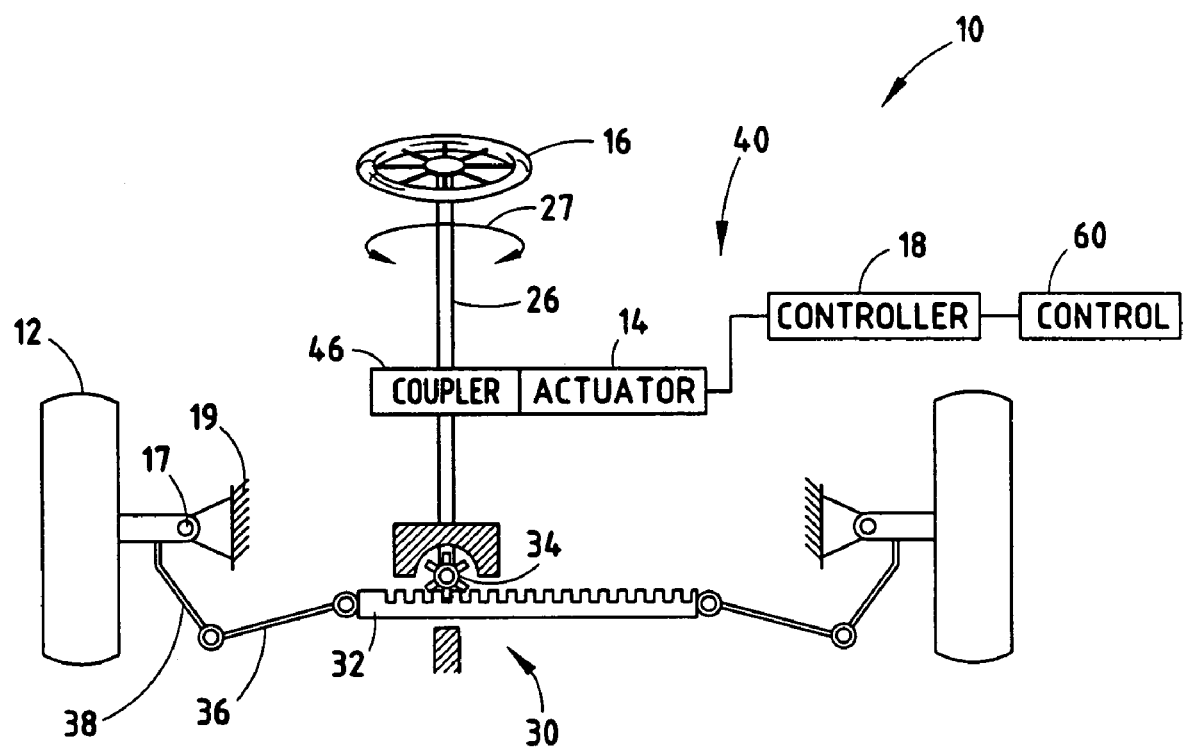
FIG. 1 is a partially schematic view of a steering system embodying the present invention, wherein a steering angle is 0°.
Figure 2:
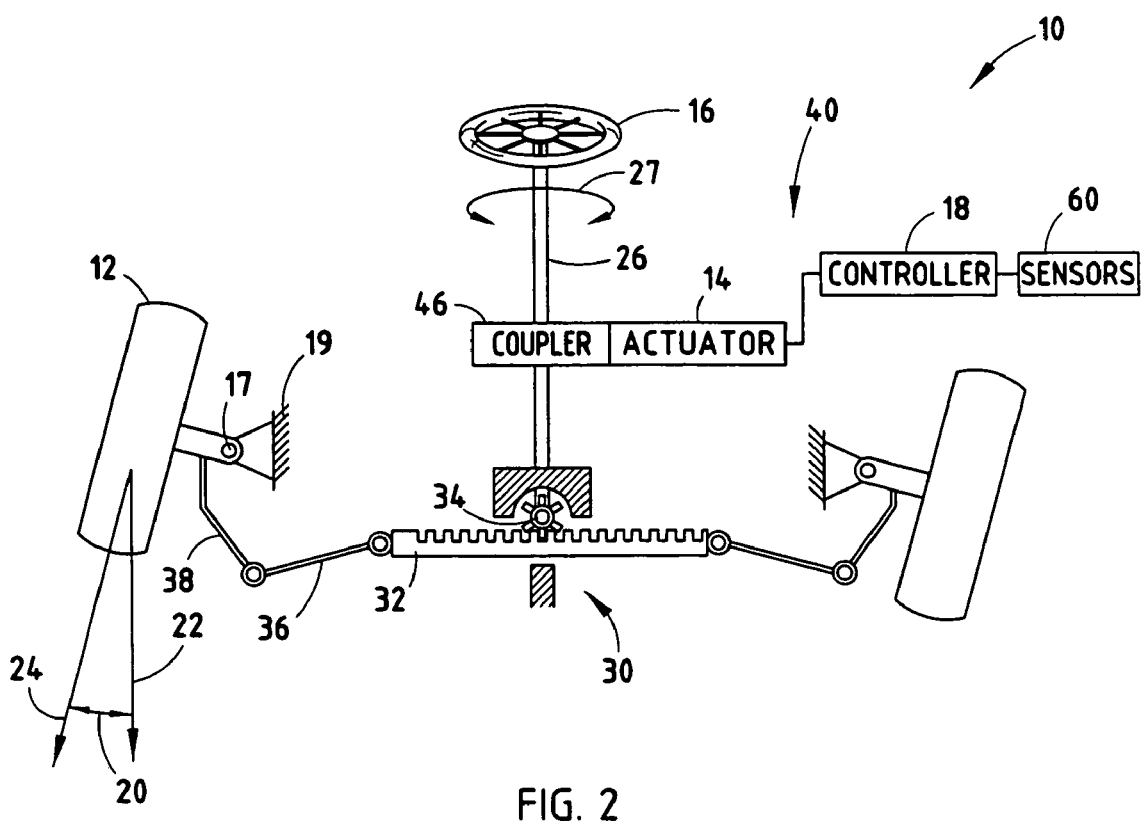
FIG. 2 is a partial schematic view of the steering system pivoted to a non-zero steering angle.

Referring to FIG. 1, reference number 10 generally designates a steering system for a motor vehicle embodying the present invention. In the illustrated example, the steering system 10 comprises a steerable wheel 12 defining a steering angle 20 (see FIG. 2), a powered actuator 14 controlling the steering angle and a steering wheel 16 providing a driver input control angle. The ratio of the driver input control angle to the steering angle 20 defines a steering ratio. The steering system 10 also includes a controller 18 for selectively varying the steering ratio. The controller 18 directs the powered actuator 14 to change the steering angle 20 such that the steering ratio is a function of one of at least two steering ratio graphs (e.g. 50 and 52 in FIG. 3). Each steering ratio graph varies the steering ratio in relation to the driver input control angle. The steering system 10 further includes a control 60 manually selectable by a driver of the vehicle. The control 60 communicates with the controller 18 for selecting one of the steering ratio graphs. A first one of the steering ratio graphs (e.g. 50 in FIG. 3) varies as a function of the driver input control angle in a manner that is differed than that of a second one of the steering ratio graphs (e.g. 52 in FIG. 3).

In the illustrated example, the steering system 10 includes a pair of the steerable wheels 12 that pivot about a pivot point 17 with respect to a vehicle frame 19. Each wheel defines the steering angle 20 (FIG. 2) between the longitudinal axis 22 of the associated vehicle and a central travel axis 24 of each wheel 12. It should be noted that while the steering angle 20 is defined by the pivotal movement of each of steerable wheels 12, the steering angle 20 may be defined by pivotable rear wheels if the vehicle is so equipped, and/or any other pivotable wheels.

The illustrated steering system 10 also includes a steering column 26 rotatable in a direction represented by an arrow 27, and operable to receive the driver input control angle from an operator of the vehicle via the steering wheel 16. The steering column 26 is operably linked to the steerable wheels 12 via a rack-and-pinion system 30 that includes a rack 32 and a pinion gear 34, a pair of drag links 36, and a steering arm 38. Although the present example utilizes a rack-and-pinion steering system, it should be noted that other steering systems compatible with the steering system 10 described herein may be utilized.

The steering system 10 further includes a basic active front steering system 40 that includes the controller 18 in operable communication with the powered actuator 14. The powered actuator 14 is operably connected to the steering column 26 via a coupler 46. The active front steering system 40 assists in pivoting the steerable wheels 12. Although a particular kind of active front steering system is described herein, other systems known in the art may be utilized. In basic operation, the active front steering system 40 augments the driver input control angle from the driver as applied to the steering wheel 16, via the powered actuator 14. The steering angle 20 as defined by the steerable wheel 14 is determined by a combination of the driver input control angle and an additional steering angle supplied by the powered actuator 14. The additional steering angle supplied by the powered actuator 14 is determined by the following equation:

$$\alpha_{ASA} = \delta_{DICA}((R_A - R_D)/R_D);$$

wherein $\alpha_{ASA}$=the additional steering angle supplied by the powered actuator 14, $\delta_{DICA}$=the angle change of the steering wheel 16 as determined by the driver input steering angle, $R_A$=the steering ratio of the vehicle without the additional steering angle and $R_D$=the desired steering ratio. For example, if the steering ratio of the steering system 10 without the powered actuator 14 is 1 (e.g., turn the steering wheel 16 five degrees and the steerable wheel 12 will turn five degrees), the desired steering ratio is 5 (i.e., slow change of the steering angle 20 of the steerable wheel 12 compared to the change of angle of the steering wheel 16) and the steering wheel has moved five degrees, the powered actuator 14 will move the steerable wheel 12 negative four degrees. Therefore, the steering wheel 16 will rotate five degrees and the steerable wheel will rotate one degree, thereby providing the vehicle with a steering ratio of 5.

Figure 3:
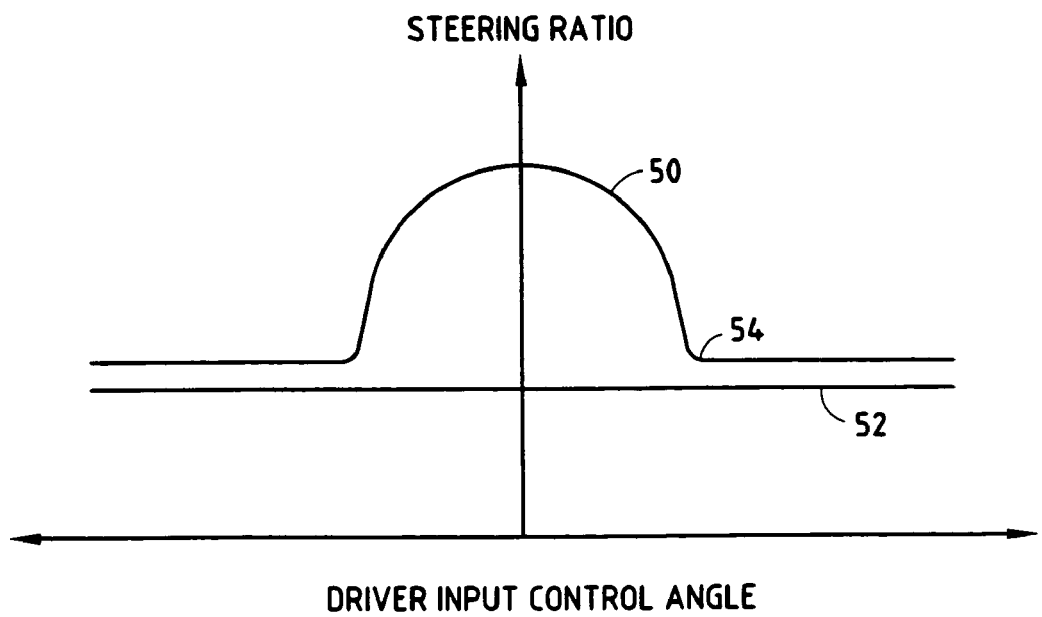
FIG. 3 is a diagram of steering ratio versus driver input control angle of a steering wheel for the present inventive steering system.

In the illustrated example, the controller 18 of the active front steering system 40 will selectively vary the steering ratio. FIG. 3 illustrates a first steering ratio graph 50 and a second steering ratio graph 52 on a chart showing the steering ratios for the first steering ratio graph 50 and the second steering ratio graph 52 as a function of the driver input control angle as inputted on the steering wheel 16 from the driver. The controller 18 will command the powered actuator 14 to provide for a steering angle as determined by a control 60 manually selectable by a driver of the vehicle directing the powered actuator 14 to change the steering angle 20 such that the steering ratio is a function of one of at least two steering ratio graphs. The controller 18 may include a general-purpose microprocessor-based controller, and may include a commercially available off-the-shelf controller. The controller 18 preferably includes a processor and memory for storing and processing software algorithms which processes inputs from the control 60 and provides output control signals to the powered actuator 14. The control 60 can be any control switch, dial, etc. within the passenger compartment of the vehicle whereby the driver can select one position or driving condition with the control 60. For example, the control 60 can be a dial having at least two rotatably selectable positions, a lever having at least two positions or a touch pad having at least two selections. The control 60 could also be another switch in the vehicle that controls another aspect of the vehicle characteristics. For example, the control 60 could be a gear box setting or an active suspension setting. The controls 60 listed above are described for illustrative purposes only and are not meant to limit the control usable in the system of the present invention.

The illustrated first steering ratio graph 50 is variable, varies with the driver input control angle and has a maximum when the driver input control angle is zero. The first steering ratio graph 50 can be used when the vehicle is travelling on a road. Therefore, when the driver input control angle is a small value (i.e., the steering wheel 18 is rotated a small angle by the driver), the steering angle 20 will be smaller than the driver input control angle. Starting from a zero position (i.e., when the steering wheel 18 is not rotated and the driver input control angle is zero) and rotating the steering wheel 18, the steering angle 20 will move very slowly at first and will begin to increase as the steering ratio lowers. Once the driver input control angle reaches point 54, the steering ratio will no longer vary and the steering angle 20 will change as the driver input control angle changes in a linear fashion. The steering angle 20 will preferably move slowly in response to the driver input control angle when the steering wheel 16 is close to the zero position because the vehicle is typically travelling fast when the steering angle 20 of the steerable wheels 12 is close to zero to give the driver better control of the vehicle. Additionally, when the steering angle 20 is high, the driver is usually carrying out a low speed maneuver such as parking and the driver does not want to have to turn the steering wheel 18 too far. Therefore, at the point 54, the steering ratio will become linear.

In the illustrated example, the second steering ratio graph 52 is linear. The second steering ratio graph can be used when the vehicle is travelling off of a road. Therefore, when the vehicle is off road driving, the driver of the vehicle will have fine control of the steering angle 20 in order to have the vehicle and the steering angle 20 react quickly to the driver input control angle.

Although only a first steering ratio graph 50 and a second steering ratio graph 52 are illustrated herein, it is contemplated that the controller 18 could vary the steering ratio between a plurality of graphs. Each of the steering graphs could be individualized for a different off or on road driving condition or for a speed within the off or on road driving condition. For example, the controller 18 could change the steering ratio along a first steering ratio graph for driving on sand, a second steering ratio graph for driving on dirt, a third steering ratio graph for driving in mud, a fourth steering ratio graph for driving up and down hills, a fifth steering ratio graph for driving on pavement, a sixth steering ratio graph for driving at fast speed, a seventh steering ratio graph for driving at slow speed, an eighth steering ratio graph for driving on dirt at a fast speed, etc. Additionally, although the steering ratio of the second steering ratio graph 52 is shown as being linear, it is contemplated that the second steering ratio graph 52 could be non-linear and/or the first steering ratio graph 50 could be linear. For example, the second steering ratio graph 52 could have the same vertical height as the first steering ratio graph 50 as illustrated in FIG. 3, and have the point 54 on the second steering ratio graph 52 spaced closer to the vertical steering ratio line than the point 54 in the first steering ratio graph 50 (i.e., a compacted equivalent of the first steering ratio graph 50 as illustrated in FIG. 3), thereby providing a sports steering ratio.

It will be readily appreciated by those skilled in the art that modifications may be made to the invention without departing from the concepts disclosed herein. For example, although the steering system is disclosed as including a direct mechanical connection between the steering wheel 16 and the steerable wheels 12, it is contemplated that the steering system and method of selectively varying the steering ratio as disclosed herein could be used with a drive by wire system. Drive by wire systems are known to those skilled in the art. Such modifications are to be considered as included in the following claims, unless these claims by their language expressly state otherwise.

We claim:

1. A steering system for a motor vehicle comprising:
   a steerable wheel defining a steering angle;
   a powered actuator controlling the steering angle;
   a steering wheel providing a driver input control angle, a ratio of the driver input control angle to the steering angle defining at least a first steering ratio and a second steering ratio;
   a controller selectively directing the powered actuator to change the steering angle according to at least one of the steering ratios, each steering ratio varying the steering angle in relation to the driver input control angle; and
   a control manually selectable by a driver of the vehicle, the control communicating with the controller for selecting one of the steering ratios;
   wherein the first steering ratio is different than the second steering ratio; and
   wherein the steering ratios are never negative.

2. A steering system for a motor vehicle comprising:
   a steerable wheel defining a steering angle;
   a powered actuator controlling the steering angle;
   a steering wheel providing a driver input control angle, a ratio of the driver input control angle to the steering angle defining at least a first steering ratio and a second steering ratio;
   a controller selectively directing the powered actuator to change the steering angle according to at least one of the steering ratios, each steering ratio varying the steering angle in relation to the driver input control angle; and
   a control manually selectable by a driver of the vehicle, the control communicating with the controller for selecting one of the steering ratios;
   wherein the first steering ratio is different than the second steering ratio; and
   wherein the first steering ratio has a maximum when the driver input control angle is zero.

3. The steering system set forth in claim 2, wherein:
   the first steering ratio is constant between a first angle of the driver input control angle and a second angle of the driver input control angle.

4. The steering system set forth in claim 3, wherein:
   the second steering ratio is constant between a third angle of the driver input control angle and a fourth angle of the driver input control angle.

5. The steering system set forth in claim 4, wherein:
   the second steering ratio is constant.

6. The steering system set forth in claim 2, wherein:
   the second steering ratio is constant.

7. A steering system for a motor vehicle comprising:
   a steerable wheel defining a steering angle;
   a powered actuator controlling the steering angle;
   a steering wheel providing a driver input control angle, a ratio of the driver input control angle to the steering angle defining at least a first steering ratio and a second steering ratio;
   a controller selectively directing the powered actuator to change the steering angle according to at least one of the steering ratios, each steering ratio varying the steering angle in relation to the driver input control angle; and
   a control manually selectable by a driver of the vehicle, the control communicating with the controller for selecting one of the steering ratios;
   wherein the first steering ratio is different than the second steering ratio; and
   wherein the first steering ratio is higher than the second steering ratio.

8. A method for selectively varying a steering ratio of a motor vehicle having a steerable wheel defining a steering angle and a steering wheel providing a driver input control angle, a ratio of the driver input control angle to the steering angle defining at least a first steering ratio and a second steering ratio, the motor vehicle further having a powered actuator controlling the steering angle, the method comprising:
   manually selecting one of the steering ratios, each steering ratio defining the steering angle corresponding to the driver input control angle; and
   directing the powered actuator according to the selected steering ratio;
   wherein the first steering ratio is different than the second steering ratio; and
   wherein the steering ratios are never negative.

9. A method for selectively varying a steering ratio of a motor vehicle having a steerable wheel defining a steering angle and a steering wheel providing a driver input control angle, a ratio of the driver input control angle to the steering angle defining at least a first steering ratio and a second steering ratio, the motor vehicle further having a powered actuator controlling the steering angle, the method comprising:
   manually selecting one of the steering ratios, each steering ratio defining the steering angle corresponding to the driver input control angle; and
   directing the powered actuator according to the selected steering ratio;
   wherein the first steering ratio is different than the second steering ratio; and wherein the first steering ratio has a maximum when the driver input control angle is zero.

10. The method set forth in claim 9, wherein:
the first steering ratio is constant between a first angle of the driver input control angle and a second angle of the driver input control angle.

11. The method set forth in claim 10, wherein:
the second steering ratio is constant between a third angle of the driver input control angle and a fourth angle of the driver input control angle.

12. The method set forth in claim 11, wherein:
the second steering ratio is constant.

13. The method set forth in claim 9, wherein:
the second steering ratio is constant.

14. The method set forth in claim 8, wherein:
the first steering ratio is higher than the second steering ratio.

15. A method for selectively varying a steering ratio of a motor vehicle having a steerable wheel defining a steering angle and a steering wheel providing a driver input control angle, a ratio of the driver input control angle to the steering angle defining at least a first steering ratio and a second steering ratio, the motor vehicle further having a powered actuator controlling the steering angle, the method comprising:
manually selecting one of the steering ratios, each steering ratio defining the steering angle corresponding to the driver input control angle; and
directing the powered actuator according to the selected ratio;
wherein the first steering ratio is different than the second steering ratio; and
wherein the steering ratios are never negative; and
providing a control within the vehicle manually selectable by a driver of the vehicle, the control communicating with a controller for selecting one of the steering ratios;
wherein manually selecting includes manually selecting a setting on the control.

16. A method for selectively varying a steering ratio of a motor vehicle having a steerable wheel defining a steering angle and a steering wheel providing a driver input control angle, a ratio of the driver input control angle to the steering angle defining at least a first steering ratio and a second steering ratio, the motor vehicle further having a powered actuator controlling the steering angle, the method comprising:
providing a controller for selecting one of the steering ratios;
manually selecting at least one of two driving conditions with a control;
communicating the selected driving condition from the control to the controller;
directing the powered actuator with the controller to change the steering angle such that the steering angle is a function of one of the steering ratios, each steering ratio corresponding to one of the driving conditions, each steering ratio varying the steering angle in relation to the driver input control angle;
wherein the first steering ratio is different than the second steering ratio; and
wherein the steering ratios are never negative.

17. A method for selectively varying a steering ratio of a motor vehicle having a steerable wheel defining a steering angle and a steering wheel providing a driver input control angle, a ratio of the driver input control angle to the steering angle defining at least a first steering ratio and a second steering ratio, the motor vehicle further having a powered actuator controlling the steering angle, the method comprising:
providing a controller for selecting one of the steering ratios;
manually selecting at least one of two driving conditions with a control;
communicating the selected driving condition from the control to the controller;
directing the powered actuator with the controller to change the steering angle such that the steering angle is a function of one of the steering ratios, each steering ratio corresponding to one of the driving conditions, each steering ratio varying the steering angle in relation to the driver input control angle;
wherein the first steering ratio is different than the second steering ratio; and
wherein the first steering ratio has a maximum when the driver input control angle is zero.

18. The method set forth in claim 17, wherein:
the first steering ratio is constant between a first angle of the driver input control angle and a second angle of the driver input control angle.

19. The method set forth in claim 18, wherein:
the second steering ratio is constant.

20. The method set forth in claim 17, wherein:
the second steering ratio is constant.

21. A steering system for a motor vehicle comprising:
a steerable wheel defining a steering angle;
a powered actuator controlling the steering angle;
a steering wheel providing a driver input control angle, a ratio of the driver input control angle to the steering angle defining at least a first steering ratio and a second steering ratio;
a controller selectively directing the powered actuator to change the steering angle according to at least one of the steering ratios, each steering ratio varying the steering angle in relation to the driver input control angle; and
a control manually selectable by a driver of the vehicle, the control communicating with the controller for selecting one of the steering ratios;
wherein the first steering ratio is different than the second steering ratio; and
wherein moving the steering wheel always moves the steerable wheel.

22. A steering system for a motor vehicle comprising:
a steerable wheel defining a steering angle;
a powered actuator controlling the steering angle;
a steering wheel providing a driver input control angle, a ratio of the driver input control angle to the steering angle defining at least a first steering ratio and a second steering ratio;
a controller selectively directing the powered actuator to change the steering angle according to at least one of the steering ratios, each steering ratio varying the steering angle in relation to the driver input control angle; and
a control manually selectable by a driver of the vehicle, the control communicating with the controller for selecting one of the steering ratios;
wherein the first steering ratio is different than the second steering ratio;
wherein the steering wheel and the steerable wheel move in the same direction; and
wherein the steerable wheel is a front wheel.

23. A method for selectively varying a steering ratio of a motor vehicle having a steerable wheel defining a steering angle and a steering wheel providing a driver input control angle, a ratio of the driver input control angle to the steering angle defining at least a first steering ratio and a second steering ratio, the motor vehicle further having a powered actuator controlling the steering angle, the method comprising:

manually selecting one of the steering ratios, each steering ratio defining the steering angle corresponding to the driver input control angle; and directing the powered actuator according to the selected steering ratio;

wherein the first steering ratio is different than the second steering ratio; and wherein moving the steering wheel always moves the steerable wheel.

24. A method for selectively varying a steering ratio of a motor vehicle having a steerable wheel defining a steering angle and a steering wheel providing a driver input control angle, a ratio of the driver input control angle to the steering angle defining at least a first steering ratio and a second steering ratio, the motor vehicle further having a powered actuator controlling the steering angle, the method comprising:

manually selecting one of the steering ratios, each steering ratio defining the steering angle corresponding to the driver input control angle; and directing the powered actuator according to the selected steering ratio;

wherein the first steering ratio is different than the second steering ratio;

wherein the steering wheel and the steerable wheel move in the same direction; and wherein the steerable wheel is a front wheel.

25. A method for selectively varying a steering ratio of a motor vehicle having a steerable wheel defining a steering angle and a steering wheel providing a driver input control angle, a ratio of the driver input control angle to the steering angle defining at least a first steering ratio and a second steering ratio, the motor vehicle further having a powered actuator controlling the steering angle, the method comprising:

providing a controller for selecting one of the steering ratios;

manually selecting at least one of two driving conditions with a control;

communicating the selected driving condition from the control to the controller;

directing the powered actuator with the controller to change the steering angle such that the steering angle is a function of one of the steering ratios, each steering ratio corresponding to one of the driving conditions, each steering ratio varying the steering angle in relation to the driver input control angle;

wherein the first steering ratio is different than the second steering ratio; and wherein moving the steering wheel always moves the steerable wheel.

26. A method for selectively varying a steering ratio of a motor vehicle having a steerable wheel defining a steering angle and a steering wheel providing a driver input control angle, a ratio of the driver input control angle to the steering angle defining at least a first steering ratio and a second steering ratio, the motor vehicle further having a powered actuator controlling the steering angle, the method comprising:

providing a controller for selecting one of the steering ratios;

manually selecting at least one of two driving conditions with a control;

communicating the selected driving condition from the control to the controller;

directing the powered actuator with the controller to change the steering angle such that the steering angle is a function of one of the steering ratios, each steering ratio corresponding to one of the driving conditions, each steering ratio varying the steering angle in relation to the driver input control angle;

wherein the first steering ratio is different than the second steering ratio; and wherein the steering wheel and the steerable wheel always move in the same direction.

\* \* \* \* \*

UNITED STATES PATENT AND TRADEMARK OFFICE
CERTIFICATE OF CORRECTION

PATENT NO. : 7,377,356 B2  Page 1 of 1
APPLICATION NO. : 10/853046
DATED : May 27, 2008
INVENTOR(S) : Turner et al.

It is certified that error appears in the above-identified patent and that said Letters Patent is hereby corrected as shown below:

Column 7, Line 30;
After "selected" insert --steering--.

Signed and Sealed this

Eleventh Day of November, 2008

JON W. DUDAS
*Director of the United States Patent and Trademark Office*